Patented Aug. 27, 1929.

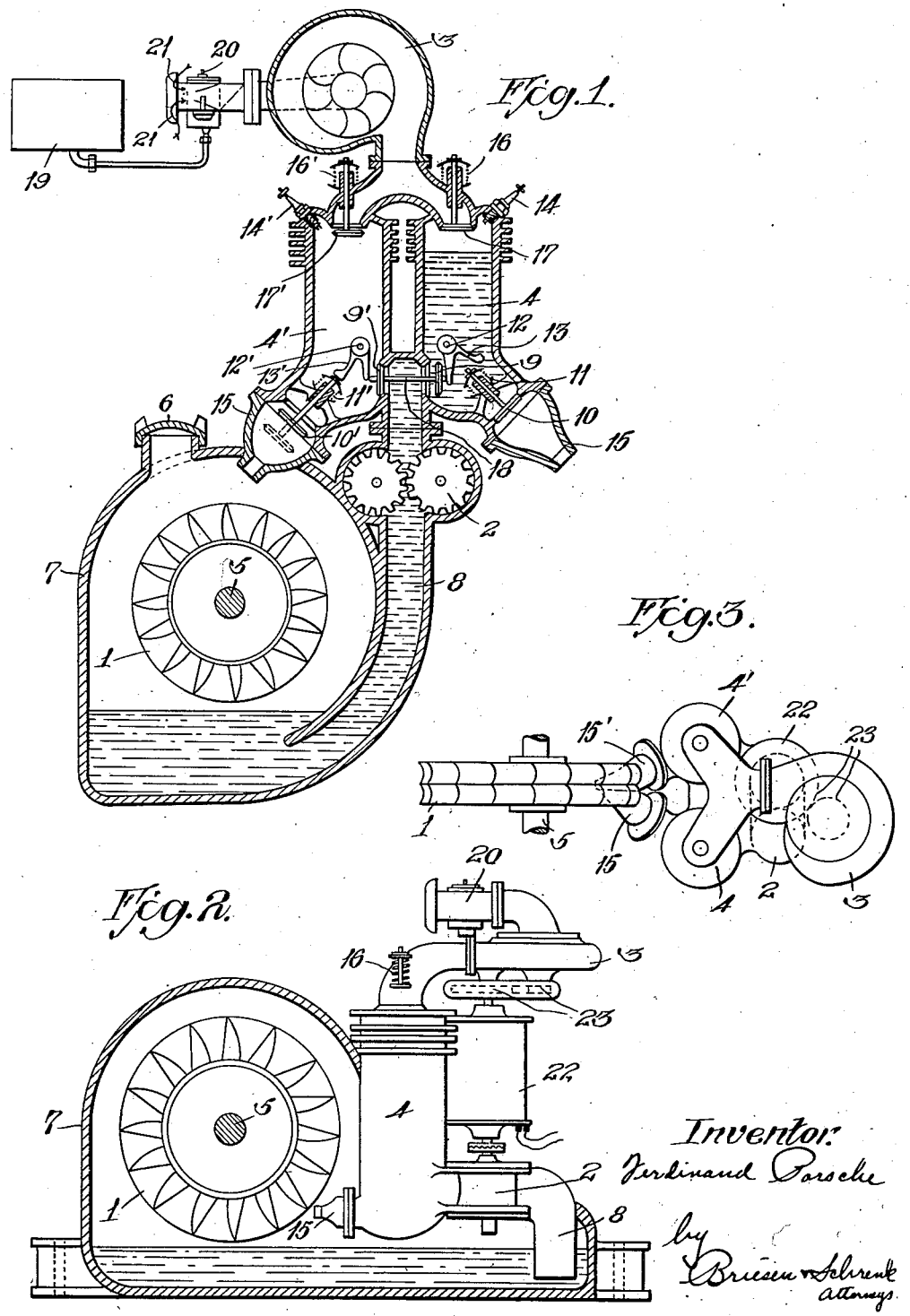

1,725,881

UNITED STATES PATENT OFFICE.

FERDINAND PORSCHE, OF STUTTGART-UNTERTURKHEIM, GERMANY, ASSIGNOR, BY MESNE ASSIGNMENTS, TO DAIMLER-BENZ AKTIENGESELLSCHAFT, OF BERLIN, GERMANY.

APPARATUS FOR OPERATING LIQUID TURBINES BY MEANS OF COMBUSTION MACHINES.

Application filed March 7, 1924, Serial No. 697,445, and in Austria March 12, 1923.

This invention relates to an apparatus for operating liquid-turbines, especially free-jet turbines by means of combustion engines, whereby the kinetic energy of the water-jet discharging from the nozzle provided on the cylinder is obtained by explosion and expansion of the driving medium of the combustion engine. In this case the liquid which is introduced under pressure into the cylinder will act as a substitute for the piston of the combustion engine and effect the compression of the driving medium, whereupon, after explosion or combustion of the same, it will be again discharged from the cylinder as a driving medium for the free-jet turbine. The arrangement according to this invention is therefore essentially characterized by a combustion engine of the two-stroke type which is combined with a free-jet turbine, whereby the quantity of the liquid which is introduced under pressure to form the piston of the combustion machine, passes through nozzles on the cylinder after explosion and impinges upon the buckets of a Pelton-wheel. There are furthermore provided means whereby not only the entire quantity of liquid, which during compression forms the pressure piston, but also the gases of combustion which after explosion follow the piston, as well as a part of the rinsing air, also following the moving column of liquid comprising the pressure piston, will act tangentially upon the buckets of the turbine. According to the method employing my new apparatus, the advantages of the turbine operation are combined with those of the operation of reciprocating engines, without, however, having the disadvantages of either system. The advantages of reciprocating engines, as known, are that the working medium flows at a smaller velocity, expansion and compression are effected in the same cylinder, the regulation of speed is simple, and the peripheral velocities are so low that in many cases a direct coupling without any intermediate gearing will be possible. The disadvantages of reciprocating machines, which are obviated according to this invention, consist in the employment of reciprocating masses, in the losses due to the transformation of the linear into rotary motion, in the limitation of the pressures for the compression in view of the danger of self-ignition, and in consequence thereof in a limited thermal efficiency, in the difficulty connected with lubrication, in the impossibility of carrying overloads, in the large consumption of fuel in case of regulating by choking, in the loss of the discharge-energy, and in the necessity of employing a fly-wheel. On the other hand, the gas-turbines which may be employed with their known advantages, have the disadvantage of a poorer efficiency, a high velocity of the working medium and consequent large work of friction which will be transformed into heat and result in losses far exceeding those of reciprocating machines, high speeds of rotation which always require a reduction gear, high operating temperatures, complicated cooling devices, and difficult regulation. According to this invention, as distinguished from known arrangements, water is used as the driving medium for the machine, the necessary energy being imparted to the water by the expansion of the combustion gases in separate chambers in which it simultaneously replaces the compressing piston.

In the accompanying drawing an example of an apparatus embodying my invention is shown; Fig. 1 is a sectional view of a machine embodying the principles of my invention, the figure being a diagrammatic representation of the machine shown in Figs. 2 and 3, with the axes of the cylinders 4, $4^1$ being shown as in the same plane as the center of the turbine wheel instead of in their true positions shown in Figs. 2 and 3; Fig. 2 is another view of the apparatus shown diagrammatically in Fig. 1; and Fig. 3 a top view of the apparatus of Fig. 2.

The apparatus according to this invention consists essentially of a free-jet turbine 1, a water-pump 2, a blower 3 for the mixture of the low pressure gases and of one or more twin-groups of combustion chambers 4 and 4'. The mode of operation of the device is as follows:

By operating the pump 2, which is preferably driven by a motor arranged separately from the driving axle 5, the water, which is discharged from the turbine 1 and collects at the bottom of a casing 7 having a filling opening 6, is introduced through a raising tube 8 and a water inlet valve 9 in one of the two working chambers 4 and 4', which had been previously rinsed out by the blower 3 and is filled with fresh gas. The discharge valve 10, whose spring 11 is so dimensioned that it will just resist to the pressure of the compression, will be released by the opening of the water inlet valve 9, which actuates a double lever 13 rotatable around the point 12 in such a manner that it will be moved out of contact with the stem of the discharge valve 10 and permit the valve to be closed by the pressure of the spring 11. The water entering through the pump 2 and the open valve 9 will now compress the gas mixture in front of it, which mixture is caused to explode either by a spark plug 14 or preferably by self-ignition at a correspondingly high degree of compression. The sudden increase in pressure will now close the water-inlet valve 9 and simultaneously open the discharge valve 10 against the action of spring 11 which is adjusted to hold the valve closed only at the compression pressure. The closing of the water valve permits the locking lever 13 to drop and engage the stem of the valve 10 to hold said valve, against the pressure of spring 11, in its open position. The expansion of the combustion gases will now drive the entire water piston in the combustion-chamber at proper velocity out through the nozzle 15, the discharging water-jet acting upon the buckets of the turbine wheel 1 thus driving the latter. Since the discharge valve 10 is retained through the locking lever 13 in its open position the combustion gases, whose pressure is reduced to a certain degree, will follow the water and will be discharged through the nozzle 15 against the bucket wheel of the turbine. The energy, which is still present in the discharge gases, therefore, will in its greater part be transformed into useful work in contra-distinction to gas engines of ordinary construction. If the pressure of the discharge gases has fallen below that of the gas-compressor 3, which acts with a small surplus of pressure, the valve 17 adjusted by means of the spring 16 upon this surplus of pressure will cause the fresh air introduced by the compressor to push the discharge gases forward and rinse out the cylinder. The closure of the discharge valve 10 and the simultaneous entrance of the water is effected by having the two water intake valves 9 and 9' positively connected with each other by a rod 18, in such a way that upon closing of the one valve the other will be opened. As the explosion has in the meanwhile taken place in the chamber 4' and the valve 9' has been closed, the valve 9 will be opened, the lock 13 for the discharge valve 10 will be released and the latter be brought to its closed position by action of the spring 11. In the drawing the nozzle 15, which similarly to nozzle 15' acts upon the bucket wheel 1, is supposed to be turned into the plane of the other cylinder. The fuel container is designated by the reference numeral 19, the vaporizer for said container is shown at 20, while the arrows 21 indicate the entrance of the air into the blower 3 and into the vaporizer 20. The temperature of the water during the working process is kept at a degree permissible for cooling, that is the water will have a temperature at which it will develop steam. Thus, the gas-mixture will be supplied during compression with water in the form of steam, which latter will, due to expansion, act with increasing energy during such expansion. An essential advantage of the process carried out with the apparatus of this invention consists in the best possible utilization of the introduced heat. The compression, in contra-distinction to that in reciprocating engines, may be increased to the utmost limit of self-ignition thereby attaining a high average pressure and moreover avoiding any injurious residue of combustion in the cylinder after being rinsed out, as is the case with reciprocating engines. This is due to the fact that the piston which consists of water will be entirely discharged through the nozzle and the subsequent scavenging air will be therefore merely blown through the cylinder. Moreover, the steam which during explosion will be liberated will act in the same way with increasing energy as with the complicated mode of injecting water into reciprocating engines and gas turbines. The discharge gases will also, in contrast to reciprocating engines, serve for increasing the energy, because they are made to act upon the turbine wheel. The conditions of cooling are very favorable, because the combustion chamber as well as the turbine wheel are mainly in contact with water and are exposed to the action of the hot gases for a very short time only.

In order to obtain a better thermal efficiency, the temperature of the water may be kept at a rather high degree. Since the efficiency of a modern high pressure turbine will at least equal the efficiency of the crank and controlling mechanism of reciprocating engines, and the utilization of the heat in the present plant is far better, the total efficiency of the plant will also be better than that of a reciprocating engine. Also, according to this invention the velocities of the gas and the water with the pulsating mode of working will be relatively small, so that the frictional work and therewith the losses will remain small, while on the other hand the advantages of the gas turbine, such as absence of reciprocating working masses and vibrations during operation, and little lubrication, will come fully into effect in the present system. The noiseless operation due to absence of reciprocating masses is enhanced by the fact, that the discharge gases act upon the turbine wheel thus bringing about a damping of the discharge noises. The speed of rotation of the turbine wheel 1 may be kept at such a value that a reduction gear may be dispensed with for the ordinary conditions found in the driving of working machines. The regulation of the plant may be accomplished in several ways in a simple manner. For attaining good regulation, however, it will be advantageous to drive auxiliary machines by a common electric motor 22, as shown in Figs. 2 and 3. In this case the water pump 2 is directly coupled with the electric motor 22, while the gas blower 3 is connected with the motor by means of intermediate transmission wheels 23 in order to obtain smaller dimensions and a multiple of the speed of the electric motor for the blower. The motor 22 may, for example, be supplied from any suitable source of current which may also serve for starting the machine, since the working process will be initiated at the moment when the functioning of the water pump and of the gas-blower begins. In this manner, therefore, a starting of the plant by means which are separate therefrom may be dispensed with. The regulation may be accomplished in any well-known manner. By using as shown in Figs. 2 and 3 a separate drive for the water-pump and the blower, independently from the turbine and by regulating the speed of the motor 22 it will be possible to obtain by this regulation alone an extremely fine regulation of the plant, because through variation of the water or gas quantity the pulsating working process in the cylinders and the speed of rotation of the turbine will be retarded or accelerated under otherwise unchanged conditions. Besides, by enlarging the cross-section of the nozzle, which is adjusted for normal torque, the water will discharge through the nozzle at unchanged velocity and thus flow off in greater quantity, whereby the turbine wheel 1 will obtain more water in a unit of time. In this case, naturally, the speed of rotation of the water-pump 2 and of the gas-blower 3 must be increased correspondingly to the greater demand, thus enabling the torque of the turbine to be essentially increased. A change of the torque moreover, will be made possible in a very simple manner by varying the pressure of the pump, since the variable compression following therefrom will have the result of producing a change of the output of the plant. The constructive details of the device may be changed as desired. In order that the pressure of the liquid upon the buckets of the turbine wheel will be rendered more uniform during the entire period of expansion, the form of the nozzle 15 or 15' as well as the spring 11 is so adapted to the stroke of the valve that the valve will, due to the force of the explosion, move to the position shown in the dotted lines at the left hand side of Fig. 1 and will approach the wall opposite to the opening of the closure in such a manner, that the cross-section of the discharge opening will become so narrow as to exert a temporary throttling action, thereby preventing an excessive increase of the water velocity immediately after the explosion. The high pressure of explosion will thus act for some time upon the water piston, whereupon, as the pressure decreases, the valve will slowly return to the position shown in full lines at the left hand side of Fig. 1, but will not reach such position before the last quantities of liquid and exhaust gases have been discharged.

I claim:

1. In an explosion engine of the class described, the combination of two internal combustion chambers, a plurality of discharge nozzles, one for each of said chambers, a water supply conduit and one of said nozzles in communication with each chamber, an admission valve for each of said chambers mounted in said conduit to be closed directly by the increase of pressure due to the combustion in said chamber, an outlet valve in each of said chambers to be opened directly by the increase of pressure due to the combustion in said chamber and controlling the water discharge through said nozzle, and means for locking said outlet valve in open position when the admission valve is in closed position.

2. In an explosion engine of the class described, the combination of two internal combustion chambers, a plurality of discharge nozzles, one for each of said chambers, a water supply conduit and one of said nozzles in communication with each chamber, an admission valve mounted in said conduit to be closed directly by the increase of pressure due to the combustion in said chamber, an outlet valve controlling the water discharge through said nozzle, and mounted to be opened directly by said pressure increase, and yielding means tending to close said outlet valve and so designed as to keep said valve closed against the compression pressure but to permit it to open under the combustion and expansion pressures, and means operatively associated with said admission valve and controlling the movement of said outlet valve so as to prevent the closing of the latter until said admission valve is opened.

3. An explosion engine of the type set forth in claim 1 in which a common water supply line is provided for the two explosion chambers.

4. An explosion engine as set forth in claim 1 in which a common water supply line and a common water supply pump is provided for said two chambers.

5. In an explosion engine of the type described, the combination of two combustion chambers having water discharging nozzles, a water admission valve for each chamber, a common spindle connecting said valves to cause the valve of one chamber to be open when the valve of the other chamber is closed, an outlet valve controlling each of the aforesaid discharge nozzles, a spring for normally holding said outlet valve in closed position, and a lever operatively associated with the water inlet valve of each chamber and movable into the path of movement of said outlet valve to hold such outlet valve open against the action of said spring when said admission valve is closed.

6. In an explosion engine of the type described, the combination comprising an explosion chamber, a discharge nozzle communicating therewith, a water admission valve mounted in said chamber to be shifted directly by increase of pressure due to the explosion of the driving medium, a water outlet valve controlling said nozzle, a spring for normally holding said valve closed, and means operatively associated with said admission valve and movable into the path of movement of said outlet valve to cause the latter to be held open against the action of said spring when said admission valve is closed.

7. In an explosion engine of the type described, the combination of an explosion chamber, a discharge nozzle communicating therewith, a water-inlet valve, a spring-pressed water-outlet valve arranged to be opened under the pressure due to the explosion of the charge in the chamber, a gas-inlet valve connected to a source of air under pressure, a lock for said water-outlet valve to maintain the same in open position while the pressure in said chamber is reduced below that of the compressed air, said reduction in pressure causing said gas-inlet valve to be automatically opened to admit a charge of scavenging air, a timed control for opening said water-inlet valve and means operable upon the opening of said last-mentioned valve to release said lock to permit said outlet valve to close.

8. In an explosion engine of the type described, the combination of an explosion chamber, a discharge nozzle communicating therewith, a water-inlet valve mounted in said chamber so as to be closed directly by increase of pressure due to the explosion in said chamber, a water-outlet valve for said chamber, synchronized valve-operating means for opening said water-inlet valve, and a locking member, operatively associated with said inlet valve so as to be released upon opening of the latter, for preventing the closing of said outlet valve until said inlet valve is opened.

9. In an explosion engine of the type described, the combination of an explosion chamber provided with a nozzle for discharging a stream of fluid under pressure, a source of supply of water under pressure for said chamber, a water-inlet valve arranged to be closed by the increase in pressure due to the explosion of a charge in the chamber, a spring-pressed outlet valve arranged to be opened by said increase in pressure, a lock for maintaining said outlet valve in open position against the action of its spring during the escape of the expanding driving gases from said chamber, whereby both the water and the gases under pressure are completely discharged from said chamber, a timed control for opening said water-inlet valve, and means operated upon the opening of said last-mentioned valve to release said lock to permit said outlet valve to close.

In testimony whereof I affix my signature.

FERDINAND PORSCHE.